United States Patent [19]

Lynas, III

[11] Patent Number: 4,671,556
[45] Date of Patent: Jun. 9, 1987

[54] AUTOMOBILE TRUCK LID RACK

[76] Inventor: William P. Lynas, III, 220 Nice La., Newport Beach, Calif. 92663

[21] Appl. No.: 813,057

[22] Filed: Dec. 24, 1985

[51] Int. Cl.⁴ .............................................. B60R 9/00
[52] U.S. Cl. .................................. 296/37.1; 224/313; 211/123
[58] Field of Search ................... 296/37.1, 76; 224/42, 224/42 R, 313; 211/123, 124; 248/251

[56] References Cited

U.S. PATENT DOCUMENTS

| | | | |
|---|---|---|---|
| 2,147,625 | 2/1939 | Brothers | 211/123 |
| 2,532,909 | 12/1950 | Hart | 224/313 |
| 2,573,102 | 10/1951 | Hennessy | 296/37.1 |
| 3,319,853 | 5/1967 | Wigington | 224/313 |

Primary Examiner—Robert R. Song

[57] ABSTRACT

A rack for the holding of clothing and like articles, to be fashioned to the underside of an automobile luggage compartment or trunk lid comprising a pair of mounting members to be secured to the trunk lid cover, and a pair of support members which attach to such mounting members. Secured to such support members is one or more clothes bars as well as a bag for the holding of garments. Plastic clips are also included for holding garments to the clothes bar. The mounting members are bonded to the lid, and the support members are secured thereto by a dovetail sliding connection whereby the support members and bars may be removed as desired.

10 Claims, 6 Drawing Figures

AUTOMOBILE TRUCK LID RACK

The present invention relates generally to racks for the holding of different types and styles of garments, but more particularly to such racks which are mounted on the underside of the lid of automobile trunks or luggage compartments.

BACKGROUND OF THE INVENTION

As will be well understood by most individuals, it is desirable today to utilize all available space for the orderly housing and storing of articles of clothing and the like. That is, today storage space is typically at a premium such that one must make use of all available space in order to have an orderly, systematic way of life.

Also, more and more activities are taking place away from the home, such as participation in sporting events and the like. In fact, today more people are jogging and working vigorously to maintain optimum health which necessitates physical exercise. As such, individuals frequently leave home with workout or sport clothing to go to a gymnasium or jogging area.

The need for storing such recreational clothing within a vehicle has become apparent due to these many factors.

OBJECTS OF THE INVENTION

Accordingly, it is an object of the present invention to provide a rack whereon different articles of clothing can be stored, and which rack can be mounted within an automobile.

Another object of the present invention is to provide a rack as characterized above which is adapted to be mounted out of sight within the automobile when the luggage compartment lid is closed.

A still further object of the present invention is to provide a rack as characterized above which is adapted to be quickly dismounted from the automobile so as to provide additional storage space within the automobile.

Another even still further object of the present invention is to provide a rack as characterized above which comprises mounting members which are adhesively bonded to the interior of the automobile trunk or luggage compartment lid, and wherein the remaining portions of the rack are secured to such mounting members by dovetail connections so that the major portions of the rack can be slidingly removed and stored elsewhere.

Another object of the present invention is to provide a rack as characterized above which is adapted to hold articles of clothing and the like regardless of whether the automobile trunk lid is open or closed.

Another object of the present invention is to provide a rack as characterized above which is simple and inexpensive to manufacture, and which is rugged and dependable in operation.

BRIEF DESCRIPTION OF THE DRAWINGS

The novel features which I consider characteristic of my invention are set forth with particularity in the appended claims. The invention itself, however, both as to its organization and mode of operation, together with additional objects and advantages thereof, will best be understood from the following description of specific embodiments when read in connection with the accompanying drawings, in which:

Like reference characters indicate corresponding parts throughout the several views of the drawings.

DESCRIPTION OF THE PREFERRED EMBODIMENT

Figure 1:
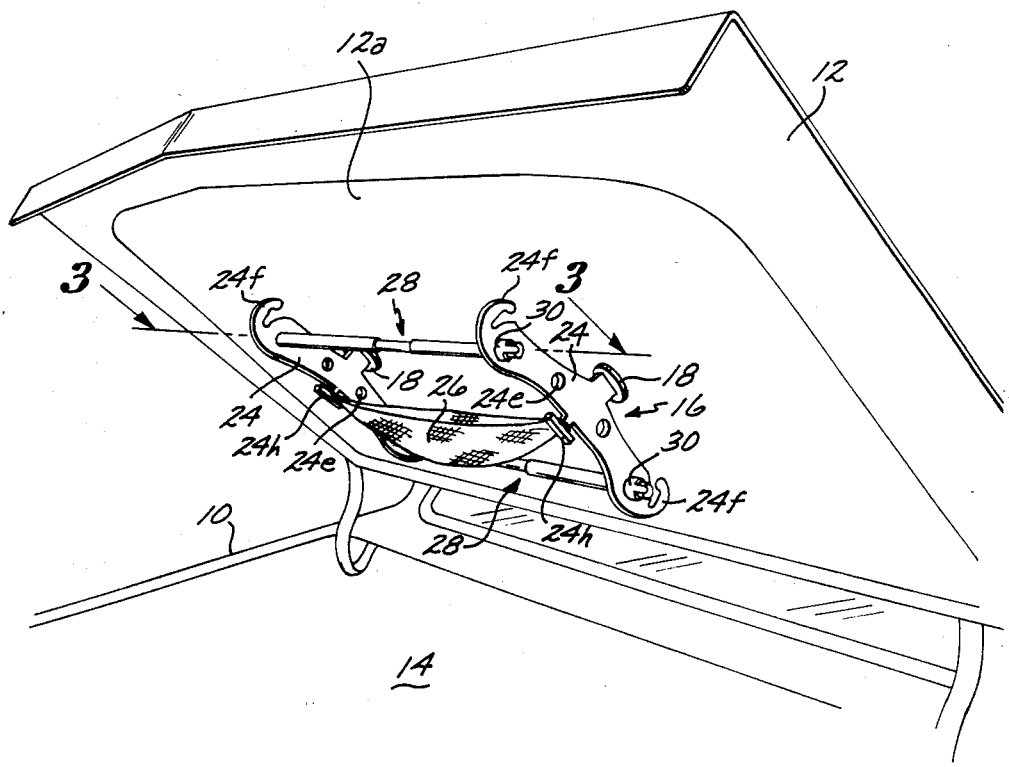
FIG. 1 is a fragmentary perspective view of a rack according to the present invention secured to the interior of an automobile trunk or luggage compartment lid.

Referring to FIG. 1 of the drawings, there is shown therein, the rear portion 10 of an automobile showing a trunk or luggage compartment lid 12 in its open position exposing the interior surface 12a thereof, as well as the luggage compartment opening 14. Attached to the interior surface 12a of trunk lid 12 is a rack 16 according to the present invention.

Figure 2:
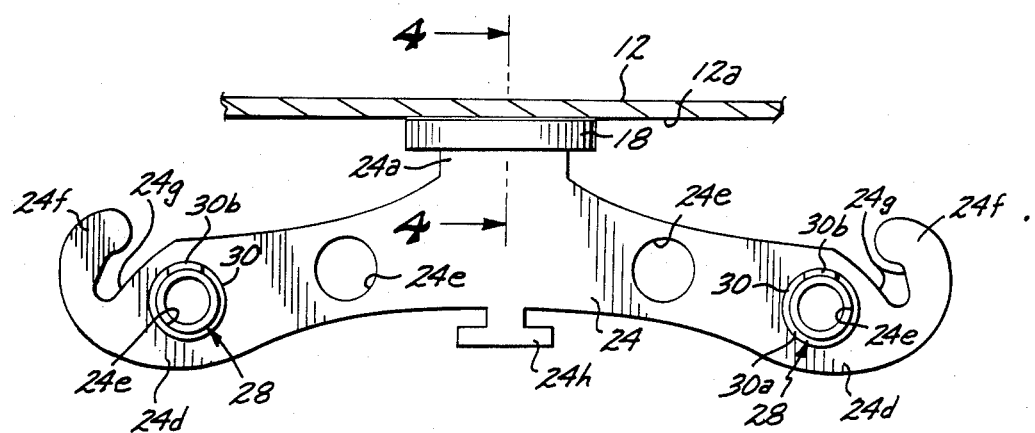
FIG. 2 is a fragmentary sectional view of the trunk lid showing the rack of FIG. 1 in side elevation.
Figure 4:
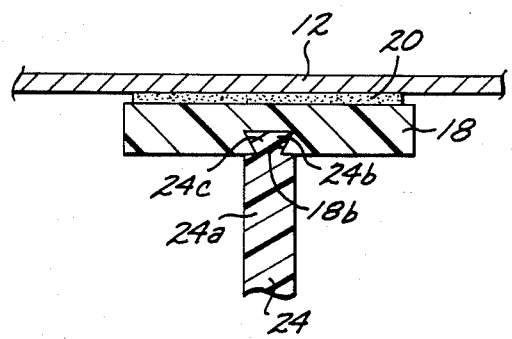
FIG. 4 is a fragmentary sectional view taken subsantially along line 4—4 of FIG. 2 of the drawings.

Shown most particularly in FIGS. 2 and 4 of the drawings, rack 16 comprises two mounting members 18 formed of any appropriate material such as wood, metal, plastic and the like, although for reasons of cost and ease of manufacture, plastic materials have been found to be most suitable. Each member 18 is shown in generally circular or cylindrical form, although, as will be readily apparent to those persons skilled in the art, the particular shape or thickness is not germane to the instant invention. As shown most particularly in FIGS. 1 and 6 of the drawings, each of the substantially identical mounting members 18 is formed with a cylindrical peripheral surface 18a, and a cutout or groove 18b in the form of a dovetail having sloping sides, as shown most particularly in said FIG. 6. Groove or slot 18b may extend the entire length of mounting member 18, as will hereinafter become more apparent.

Figure 6:
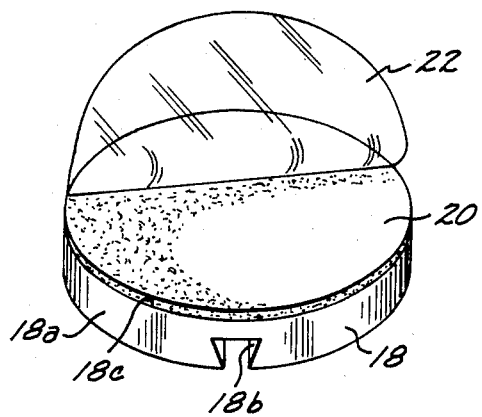
FIG. 6 is a perspective view of a mounting member for securing the rack to the trunk or luggage compartment lid.

An adhesive 20 is applied to a flat surface 18c of each mounting member 18 to enable the mounting members 18 to be firmly secured to the interior surface 12a of the luggage compartment lid. A protective sheet 22 of thin plastic material may be provided on the adhesive 20. Although not necessary for successful practice of the instant invention, such sheet may be transparent, as shown in FIG. 6.

A pair of support members 24, also formed of plastic material, are provided for attachment individually to mounting members 18. Each such support member 24 is provided with an extension 24a, the marginal edge 24b of which is formed with a male dovetail 24c which extends the entire width of extension 24a. Such dovetail 24c is adapted to slidingly fit within the female dovetail opening 18b in mounting member 18, as shown most particularly in FIG. 4 of the drawings.

Each of the support members 24 is formed with substantially identical opposite end portions 24d, each of such end portions being formed with one or more through openings, as shown at 24e, as well as a reversely bent marginal end portion 24f providing a slot 24g which is almost closed so as to retain garments or coat hangers throughout the entire opening and closing pivotal movement of the trunk lid 12, as will hereinafter become more apparent.

Intermediate the opposite end portions 24d of each support member 24 is an inverted T-section 24h which is adapted to either retain articles of clothing or a net bag 26 formed of mesh or the like, as shown most particularly in FIG. 1 of the drawings.

Although each of the several support members 24 may be formed out of any appropriate material and by any preferred manufacturing process, it has been found most appropriate to form such support members in a molding process out of plastic. In this way, such members can be manufactured quickly and inexpensively with sufficient physical properties for successful practice of the present invention.

Figure 3:
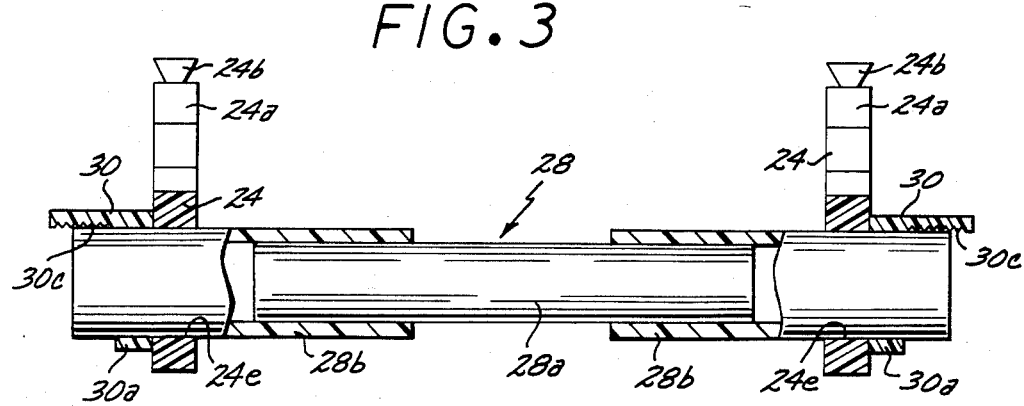
FIG. 3 is a sectional view of the rack, taken substantially along line 3—3 of FIG. 1 of the drawings.

Extending between the support members 24 is one or more clothes bars 28, as shown in FIG. 3. Each such clothes bar 28 comprises a rod 28a and a pair of tubular retaining members 28b, the latter of which are firmly secured in the aforementioned openings 24e in the respective support members. The rod 28a telescopically fits within the several tubular members 28b to enable a given clothes bar 28 to be expansible or contractible in accordance with the particular distance between support members 24, as will hereinafter become more apparent.

Figure 5:
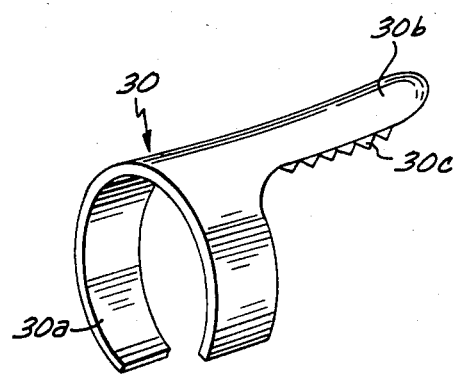
FIG. 5 is a perspective view of a holding clip.

To retain garments in firm position on the clothes bar 28, one or more plastic clips 30 are provided. Each such clip, as shown in FIG. 5, is formed with a generally circular mounting portion 30a, and an extension 30b the undersurface of which is provided with a series of serrations or irregularities 30c. Each clip is formed of resilient plastic material, and the extension 30b is so positioned relative to the circular mounting portion 30a that the serrations 30c are generally urged inwardly against the clothes bar 28 when mounted thereon, as shown in the drawings.

The subject luggage compartment lid rack 16 is mounted generally in the following manner: The most appropriate, flat and substantially coplanar surfaces are identified on the interior surface 12a of the trunk lid 12. Thereafter, the mounting members 18 are secured thereto in any appropriate manner which will cause the dovetail slots 18b in the respective mounting members 18 to be generally parallel. That is, the rack 16 may be generally assembled away from the trunk lid 12, including the mounting members 18, and as thus assembled with the dovetail slots or grooves 18b parallel, the mounting members 18 can be secured to the luggage compartment lid interior surface 12.

However properly positioned, the members 18 are adhesively secured to the surface 12a. To facilitate this, of course, the protective sheet 22 is first removed from each of the mounting members 18, and the latter members are then firmly pressed against the interior surface of the trunk lid 12.

The clothes bars 28 are then positioned as shown in FIG. 3 of the drawings, and the clips 30 are arranged thereon either on the opposite ends of a particular clothes bar 28, or between the spaced support members 24. The bag 26 formed of netting material is then tied between the spaced inverted T-sections 24h of the several support members 24.

Clothing of substantially any style or description can then be hung from clothes hangers which are caused to rest in one of the slots 24g at either end of one of the support members 24, or such clothes can be placed in the bag 26, or suspended from one or more of the bars 28.

In the event the space 14 of the trunk or luggage compartment of the automobile requires the removal of the rack 16, as for instance to carry large objects within the trunk, it is a simple matter to remove the rack 16 by sliding the support members 24 from the mounting members 18. This, of course, is facilitated by the dovetail interconnection between the various parts as above described. Thereafter, it is equally simple to reestablish the rack 16 within the luggage compartment by sliding the support members 24 into the mounting members 18.

It is also contemplated within the purview of the present invention that support members 24 could be hingedly connected to the respective mounting members 18 such that the original volume of the luggage compartment can be reestablished by removing the clothes bars 28 and pivoting the support members to a position against the compartment lid. Spring biased hinges are readily available for that purpose so that the support members would be held in such retracted position against the lid.

Although I have shown and described certain specific embodiments of my invention, I am well aware that many modifications thereof are possible. The invention therefore, is not to be restricted except insofar as is necessitated by the prior art and by the spirit of the appended claims.

I claim:

1. An automobile trunk lid rack comprising in combination, a pair of support members each of which is formed with a dovetail extension and at least one opening, a mounting member of each of said support members to be secured to an automobile trunk lid and formed with a dovetail slot to receive said dovetail extension to thereby retain the respective support member, and one or more clothes bars having opposite ends adapted to fit within corresponding openings in said support members to be positioned in spaced relation to said trunk lid.

2. An automobile trunk lid rack according to claim 1 wherein adhesive material is applied to each of said mounting members enabling them to be mounted to said trunk lid.

3. An automobile trunk lid rack according to claim 2 wherein said support members are formed of plastic and are individually formed with opposite end portions adapted with hanger portions.

4. An automobile trunk lid rack according to claim 3 wherein said hanger portions are so formed as to provide a nearly closed loop for retaining articles.

5. An automobile trunk lid rack according to claim 4 wherein the clothes bar includes elements which telescopically fit together to provide a continuous bar which is adjustable in accordance with the spacing between support members.

6. An automobile trunk lid rack according to claim 5 wherein one or more clips are mounted on the clothes bar for retaining articles thereon.

7. An automobile trunnk lid rack according to claim 6 wherein each clip is formed with a body portion and an extension therefrom having means for gripping articles against the clothes bar.

8. An automobile trunk lid rack according to claim 7 wherein said gripping means includes an irregular undersurface on said extension for retaining articles against the clothes bar.

9. An automobile trunk lid rack according to claim 8 wherein said clip is formed of flexible plastic material, and is so shaped as to bias said extension toward said bar when the clip is mounted or assembled thereon.

10. An automobile trunk lid rack according to claim 9 wherein the opening in each of said support members is a through hole wherein one end of a clothes bar is positioned.

* * * * *

UNITED STATES PATENT AND TRADEMARK OFFICE
CERTIFICATE OF CORRECTION

PATENT NO. : 4,671,556
DATED : June 9, 1987
INVENTOR(S) : WILLIAM P. LYNAS III

It is certified that error appears in the above—identified patent and that said Letters Patent is hereby corrected as shown below:

Title of invention, item (54)

on page of Abstract, and column 1, line 2 should be

AUTOMOBILE TRUNK LID RACK

Signed and Sealed this

Thirteenth Day of October, 1987

Attest:

DONALD J. QUIGG

Attesting Officer

Commissioner of Patents and Trademarks